United States Patent [19]

Brinkmann et al.

[11] 4,039,730

[45] Aug. 2, 1977

[54] STORAGE BATTERY ELECTRODE TUBES AND METHOD OF FILLING

[75] Inventors: Jurgen Brinkmann; Josef Sucher, both of Hagen, Germany

[73] Assignee: Varta Batterie Aktiengesellschaft, Hannover, Germany

[21] Appl. No.: 656,186

[22] Filed: Feb. 9, 1976

[30] Foreign Application Priority Data

Mar. 7, 1975 Germany .............................. 2509948

[51] Int. Cl.² ........................................... H01M 4/60
[52] U.S. Cl. .................................... 429/212; 429/228
[58] Field of Search ....................... 136/43, 26, 27, 67, 136/53, 55, 74; 429/140–141, 212, 228, 238

[56] References Cited

U.S. PATENT DOCUMENTS

| 3,271,195 | 9/1966 | Beichielli et al. | 136/67 |
| 3,480,478 | 11/1969 | Sohn et al. | 136/26 |
| 3,488,218 | 1/1970 | Metzler et al. | 136/26 X |
| 3,702,265 | 11/1972 | Snyder et al. | 136/26 |
| 3,885,988 | 5/1975 | Bohle | 136/27 |

Primary Examiner—C. F. Lefevour
Attorney, Agent, or Firm—Weiser, Stapler & Spivak

[57] ABSTRACT

Tubular battery electrodes are filled with a mix of lead oxide, sulfuric acid and water to which electrolyte-resistant fibers have been added. These fibers strengthen the mass and reduce its tendency to escape through the pores of the tube envelope fabric.

Also the product resulting from this method.

17 Claims, No Drawings

STORAGE BATTERY ELECTRODE TUBES AND METHOD OF FILLING

The invention relates to a method of filling the lead core-containing tubes of tubular electrodes, and to the introduction into the tubes under pressure of paste-like active mass which includes a mixture of lead oxide, sulfuric acid and water.

In the storage battery art, it is customary to fill the tubes of tubular electrodes for storage batteries with lead oxide by shaking the powdery lead oxide into the space between lead core and tube wall. One disadvantage of this is the heavy evolution of dust, which is highly detrimental to operator-working conditions.

It has already been proposed to fill these tubes with a paste consisting of a mixture of lead oxide and water, as well as sulfuric acid (see U.S. Pat. No. 3,011,007). It is also known to add to such a paste, consisting of lead oxide, water and sulfuric acid, a hydrophilic substance, and particularly polyethylene oxide (see German Patent publication No. 1,281,515).

In working with pastes which have an additive of hydrophilic substances, there is encountered the disadvantages that such pastes exhibit low fluidity, so that high pressure is necessary to forcibly introduce the active mass. If highly aqueous pastes are used without such additives, heavy loss of mass takes place through the wall of the tube, even during introduction of the paste. Moreover, it has been observed that tubes filled in this manner exhibit a subsequent tendency to increased extrusion. This may be aggravated the fact that the tube fabric is further distended by the filling pressure.

Accordingly, it is an object of the invention to provide a method of the general type under consideration which is improved in that the filling process takes place without attendant disadvantages.

It is a further object to provide a method in which no large quantities of mass escape through the pores of the tube envelope during filling.

It is still another object to provide a method by which the high extrusion rate of the filled tube is appreciably reduced.

It is still another object to provide a product resulting from the improved method described above.

The foregoing objects, as well as others which will appear, are achieved in accordance with the invention by utilizing, for filling, a lead oxide mass intimately mixed with water and sulfuric acid, and which contains a quantity of fibers of electrolyte-resistant material. These fibers in part enter the pores of the tube walls during escape of a portion of the fluid through that wall and occlude these pores.

Thus, according to the invention, an intimately mixed mass of lead oxide, water and sulfuric acid is produced, which contains a quantity of electrolyte-resistant fibers. Preferably glass fibers are used as the electrolyte-resistant fibers but plastic fibers may also be uaed. Even in the mixed mass these fibers already tend to prevent precipitation of the lead oxide, which would lead to separation of the ingredients of the paste. Therefore, the mixed mass may be kept considerably more fluid, which makes possible its pressing into longer tubes. During pressing, a large part of the liquid escapes to the outside through the tube wall, while the mass is retained inside. During escape of the liquid, a portion of the fibers which have been added in accordance with the invention penetrate into the pores of the tube wall and are trapped there. Thereby, they produce additional occlusion of the pores of the tube wall. Finished tubes have therefore have, caught on the tube wall and in its pores, a high proportion of added fiber material, which proportion decreases toward the interior. The fiber portion which remains in the interior of the tube, i.e. in the active mass, materially contributes to increasing the strength of the active mass. This also makes that mass less inclined to become extruded. Extrusion is materially reduced by the fibers which have penetrated into the pores.

The tube itself can generally be any of the tubes known in the storage battery art. Preferably, however, tubes are used which are made of a double-woven material which forms the adjacent tubes. This woven material preferably is of glass fibers, or of glass fibers mixed with plastic fibers such as polyester fibers. If necessary, the tube material can be further stiffened by treatment with an impregnating solution containing a hardening plastic material.

In order to give the active mass sufficiently low viscosity, sulfuric acid and water is added. Mixtures have proven suitable which contained between 100 and 600 $cm^3$ $H_2O$ per kilogram of lead oxide, and preferably between 200 and 400 $cm^3$ $H_2O$, as well as 5 to 130 $cm^3$ $H_2SO_4$ of 1.4 grams/$cm^3$ density. Such extrudable masses are disclosed, for example, in U.S. Pat. No. 3,228,796.

This mass emulsion additionally contains, in accordance with the invention, a proportion of fibers, preferably glass fibers or plastic fibers such as polyester filbers. These have lengths from 1 to 6 millimeters, preferably 1.5 to 3 millimeters and thicknesses of 5 to 30 microns, preferably 8 to 20 microns. The proportion of fibers is between 0.1 and 2% by weight, relative to the lead oxide quantity, and preferably is 0.2 to 1.5% by weight.

Especially preferred is the use of thermoplastic fibers of plastic material, particularly polyethylene fibers, which exhibit a rough, jagged and scalloped surface, whereby the active surface of the fibers is increased relative to their geometric surface.

It has been found that precipitation of the lead oxide in the emulsified mass is appreciably slowed down by this type of fiber. Due to its rough and jagged surface this fiber holds the active mass back more strongly than do fibers with smooth surfaces when it is positioned in or in front of the meshes of the pocket or tube fabric. The fibers with rough and jagged surface become anchored in the active mass better than fibers with smooth surfaces. The active mass is therefore better held together and contained. As a result, the extrusion rate of the active mass is also appreciably improved. A polyethylene fiber of this type has a diameter of from 0.5 to 5 microns, and preferably 1 to 3 microns. Its length lies between 0.5 and 6 millimeters, and preferably between 1 and 3 millimeters. The quantity added of such fibers should be from 0.1 to 2% by weight relative to the lead oxide, and preferably 0.2 to 1% by weight.

To fill the tubes which contain the lead cores, apparatus can be utilized which is known for the filling of tubular voids. For example, injection molding devices may be used which are suitably adapted to the materials and operating parameters involved.

It has been found that tubular electrodes can be produced by means of the method embodying the invention, which have a particularly low extrusion rate and therefore a particularly long life. This is attributable to the fact that a portion of the fibers contained within the fiber-containing paste deposits preferentially in the vicinity of the wall, and penetrates into the pores of the tube wall, whereby occlusion of the tube wall pores is achieved. In particular in follows that the meshes of a fabric which are distended during filling with active mass are then, during the filling itself, closed again by the partially occluding fibers. As a result, even the enlargement which is unavoidably produced by the filling does not give rise to any future disadvantages.

We claim:

1. A mass-filled tubular electrode for a lead storage battery comprising:

active mass formed of a mixture of lead oxide, sulfuric acid and water, and including fibers of electrolyte-resistant material, the fibers being more densely concentrated toward the outer periphery of the tubular electrode than toward the interior.

2. The electrode of claim 1 wherein the tubular electrode is enclosed in a fabric and at least some of the fibers occlude portions of the pores of the fabric.

3. The electrode of claim 2 wherein the fibers have a rough and jagged surface.

4. The electrode of claim 3 wherein the fibers are of unprecoated glass or plastic material.

5. The electrode of claim 4 wherein the material is polyethylene.

6. A method of filling the lead core-containing tube electrodes of lead storage batteries by introduction under pressure of paste-like active mass formed of a mixture of lead oxide, sulfuric acid and water, the method being characterized in that the active mass additionally has previously had added to it a quantity of fibers of electrolyte-resistant material, and the pressure applied and viscosity of the mixture is such as to cause at least a part of said fibers to penetrate into and be trapped within the pores of the tube walls during escape of a liquid mass component through the tube wall to at least partly occlude the pores.

7. The method of claim 6 wherein the paste-like mass contains 100 to 600 $cm^3$ water, and 5 to 130 $cm^3$ sulfuric acid of 1.4 grams per $cm^3$ density, per kilogram of lead oxide, and 0.1 to 2% by weight of fibers relative to the lead oxide.

8. The method of claim 6 wherein the fibers include glass fibers.

9. The method of claim 6 wherein the fibers include fibers of electrolyte-resistant plastic.

10. The method of claim 6 wherein the fibers are from 1 to 6 millimeters long and preferably 1.5 to 3 millimeters, and have a diameter of 5 to 30 microns, and preferably 8 to 20 microns.

11. The method of claim 6 wherein the fibers have a rough and jagged surface.

12. The method of claim 6 wherein the pressure applied is such as to cause the fibers to become more densely concentrated toward the outer periphery of the tubular electrode than in the interior.

13. The method of claim 6 wherein the introducing is by injection molding.

14. The mass-filled tube electrodes made by the method of claim 6.

15. The method of claim 11 wherein the fibers are of polyethylene.

16. The method of claim 15 wherein the fibers are 0.5 to 6 millimeters long and preferably 1 to 3 millimetes, and have a diameter of 0.5 to 5 microns, and preferably 1 to 3 microns.

17. The method of claim 12 wherein the pressure is such as to cause the pores of the tube wall to become distended during filling.

* * * * *